(12) United States Patent
Naito et al.

(10) Patent No.: US 10,759,012 B2
(45) Date of Patent: Sep. 1, 2020

(54) MOTOR CONTROLLER AND MACHINE TOOL

(71) Applicant: FANUC CORPORATION, Minamitsuru-gun, Yamanashi (JP)

(72) Inventors: Genzo Naito, Yamanashi (JP); Yoshinori Hoshino, Yamanashi (JP); Kazuhiro Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 5 days.

(21) Appl. No.: 16/393,134

(22) Filed: Apr. 24, 2019

(65) Prior Publication Data
US 2019/0329370 A1 Oct. 31, 2019

(30) Foreign Application Priority Data
Apr. 27, 2018 (JP) ................................. 2018-087348

(51) Int. Cl.
*B23Q 11/00* (2006.01)
*B23Q 11/12* (2006.01)
*B23Q 11/14* (2006.01)
*H02P 23/04* (2006.01)

(52) U.S. Cl.
CPC ........ *B23Q 11/0039* (2013.01); *B23Q 11/127* (2013.01); *B23Q 11/14* (2013.01); *H02P 23/04* (2013.01)

(58) Field of Classification Search
CPC ..... B23Q 11/127; B23Q 11/14; B23Q 11/126; G05B 2219/37434; G05B 2219/37435; H02P 23/04
See application file for complete search history.

(56) References Cited

U.S. PATENT DOCUMENTS

| 10,032,686 | B2 * | 7/2018 | Okuaki | G08B 21/182 |
| 10,274,211 | B2 * | 4/2019 | Tada | F25B 49/025 |
| 2005/0207899 | A1 * | 9/2005 | Furuta | F01P 7/048 |
| | | | | 417/32 |
| 2019/0327853 | A1 * | 10/2019 | Okuaki | G05B 19/40937 |

FOREIGN PATENT DOCUMENTS

| CN | 101898315 | 12/2010 |
| JP | 7-237085 | 9/1995 |
| JP | 2011-88268 | 5/2011 |
| JP | 2012-114852 | 6/2012 |

(Continued)

*Primary Examiner* — Bickey Dhakal
(74) *Attorney, Agent, or Firm* — Wenderoth, Lind & Ponack, L.L.P.

(57) ABSTRACT

A motor controller comprises: a motor driver arranged at a housing attached to a machine support; fan motors and arranged in or outside the housing; and a control unit. The motor driver drives motors. The fan motors blow cooling air for cooling the interior of the housing. The CPU includes a machining mode selection unit allowing selection of at least either a first machining mode of machining a machining target finely or a second machining mode of machining the machining target more roughly than in the first machining mode. If the first machining mode is selected, the machining mode selection unit exerts control to change the rotation numbers of the fan motors and so as to reduce vibration to be transmitted from the housing to the support column.

7 Claims, 4 Drawing Sheets

(56) References Cited

FOREIGN PATENT DOCUMENTS

| | | |
|---|---|---|
| JP | 2014-56352 | 3/2014 |
| JP | 2015-6700 | 1/2015 |
| JP | 2016-103607 | 6/2016 |
| JP | 2017-112649 | 6/2017 |
| JP | 2017-115701 | 6/2017 |
| WO | 2010/051954 | 5/2010 |

* cited by examiner

FIG. 2

MOTOR CONTROLLER AND MACHINE TOOL

This application is based on and claims the benefit of priority from Japanese Patent Application No. 2018-087348, filed on Apr. 27, 2018, the content of which is incorporated herein by reference.

BACKGROUND OF THE INVENTION

Field of the Invention

The present invention relates to a motor controller and a machine tool including the motor controller.

Related Art

Many machine tools have the following independent (not integrated) structures: a machining unit with a spindle to which a machining member such as a drill is attachable; and a power magnetics cabinet with a motor driver for driving a motor for spindle rotation and a fan motor for cooling the motor driver.

By contrast, to achieve space saving, some machine tools have a configuration in which a power magnetics cabinet with a motor driver and a fan motor is attached to and integrated with a machining unit with a spindle. Patent document 1 discloses a machine tool having a configuration in which a fan motor for cooling a cooler is attached to and integrated with a body with a spindle through a back plate.

Patent Document 1: Japanese Unexamined Patent Application, Publication No. H07-237085

SUMMARY OF THE INVENTION

In the foregoing machine tool, however, the rotation of a fan of the fan motor may cause the vibration of the fan motor, and this vibration may be transmitted to the spindle through a support supporting the spindle. This may cause the vibration of a machining member attached to the spindle to reduce machine accuracy. In particular, if machine accuracy is reduced during finishing on a surface of a machining target, the quality of a machining surface may be reduced.

In view of the foregoing, the present invention is intended to provide a motor controller capable of suppressing transmission of the vibration of a fan motor to a machine support of a machine tool for machining on a machining target in a situation where machine accuracy is required, and a machine tool including the motor controller.

(1) The present invention relates to a motor controller (motor controller 100 described later, for example) comprising: a motor driver (motor driver 65 described later, for example) arranged at a housing (housing 31 described later, for example) attached to a machine support (support column 21 described later, for example) as a support of a machine tool (machine tool 10 described later, for example) for machining on a machining target (workpiece 50 described later, for example); a fan motor (fan motor 33, 34 described later, for example) arranged in or outside the housing; and a control unit (CPU 61 described later, for example). The motor driver drives a motor (spindle motor 24, X-axis motor 124, Y-axis motor 224, Z-axis motor 324 described later, for example) that generates power for the operation of the machine tool. The fan motor blows cooling air for cooling the interior of the housing. The control unit includes a machining mode selection unit (machining mode selection unit 55 described later, for example) allowing selection of a machining mode from at least a first machining mode of machining the machining target finely and a second machining mode of machining the machining target more roughly than in the first machining mode. If the first machining mode is selected, the machining mode selection unit exerts control to change the rotation number of the fan motor so as to reduce vibration to be transmitted from the housing to the machine support, compared to vibration to be transmitted in the second machining mode.

(2) The motor controller described in (1) may further comprise a load detector (temperature sensor 71, 72 described later, for example) that detects load applied to the motor driver. If load detected by the load detector is determined to be equal to or less than a predetermined threshold, the control unit may exert control to change the rotation number of the fan motor so as to reduce vibration to be transmitted from the housing to the machine support, compared to vibration to be transmitted in the second machining mode.

(3) In the motor controller described in (2), if the load detected by the load detector is determined to be greater than the predetermined threshold after the rotation number of the fan motor is changed to a rotation number responsive to the first machining mode, the control unit may exert control to change the rotation number of the fan motor to the rotation number of the fan motor responsive to the second machining mode.

(4) The motor controller described in (2) or (3) may further comprise an alarm generator (alarm generator 90 described later, for example) that generates an alarm. If the load detected by the load detector is determined to be greater than the predetermined threshold, the control unit may control the alarm generator so as to make the alarm generator generate an alarm.

(5) In the motor controller described in any one of (1) to (4), changing the rotation number of the fan motor may mean that the rotation number of the fan motor is reduced so as to go out of the natural vibration frequency of the fan motor, or the fan motor is stopped.

(6) In the motor controller described in any one of (1) to (5), changing the rotation number of the fan motor may mean that the rotation number of the fan motor is increased so as to go out of the natural vibration frequency of the fan motor.

(7) The present invention may also be a machine tool comprising: the motor controller described in any one of (1) to (6); the machine support; and the motor.

According to the present invention, in a situation where machine accuracy is required, transmission of the vibration of a fan motor to a machine support of a machine tool for machining on a machining target can be suppressed.

DETAILED DESCRIPTION OF THE INVENTION

First Embodiment

[Overall Configuration of Machine Tool]

Figure 1:
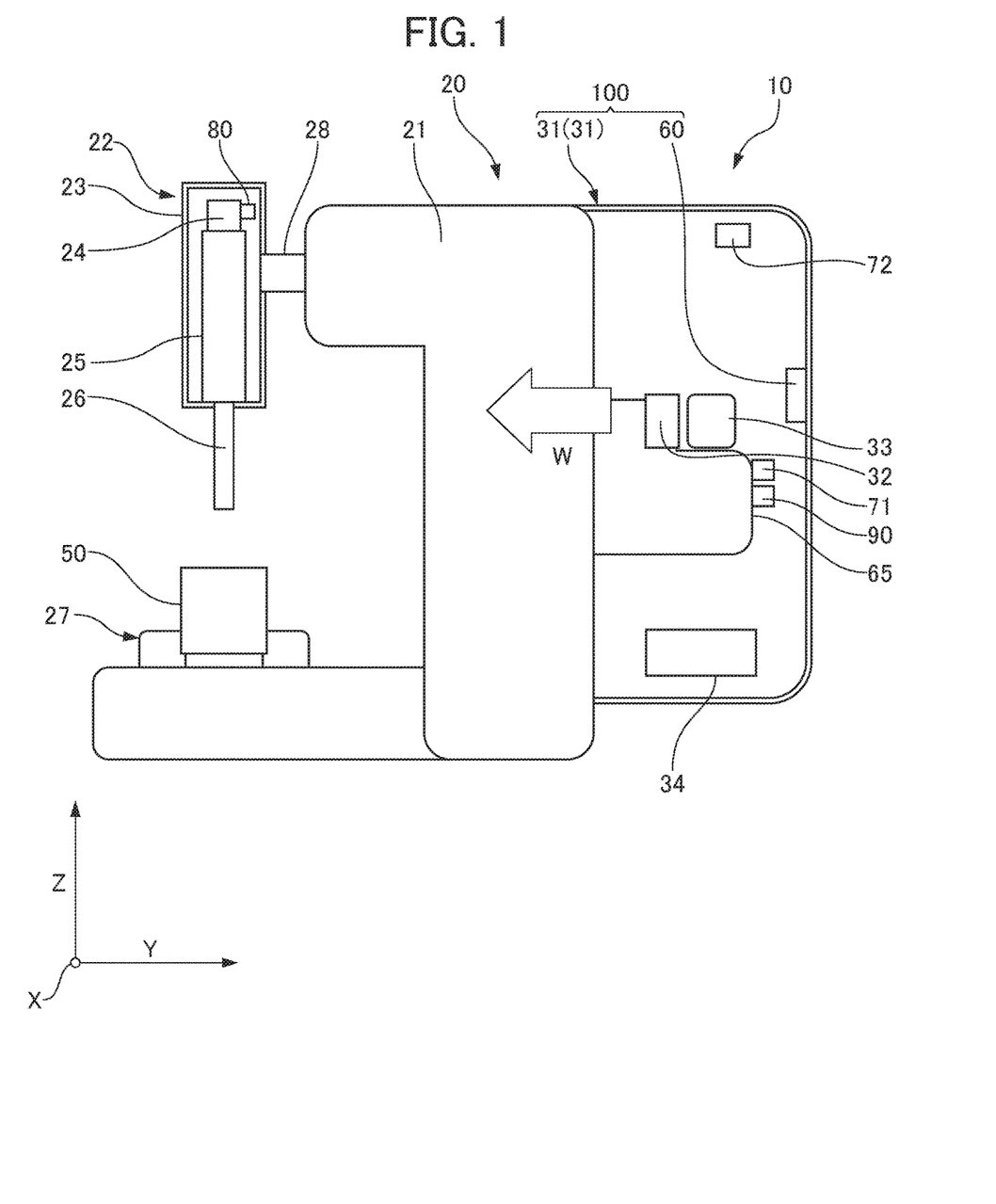
FIG. 1 is a sectional view schematically showing a motor controller according to a first embodiment of the present invention.
Figure 2:
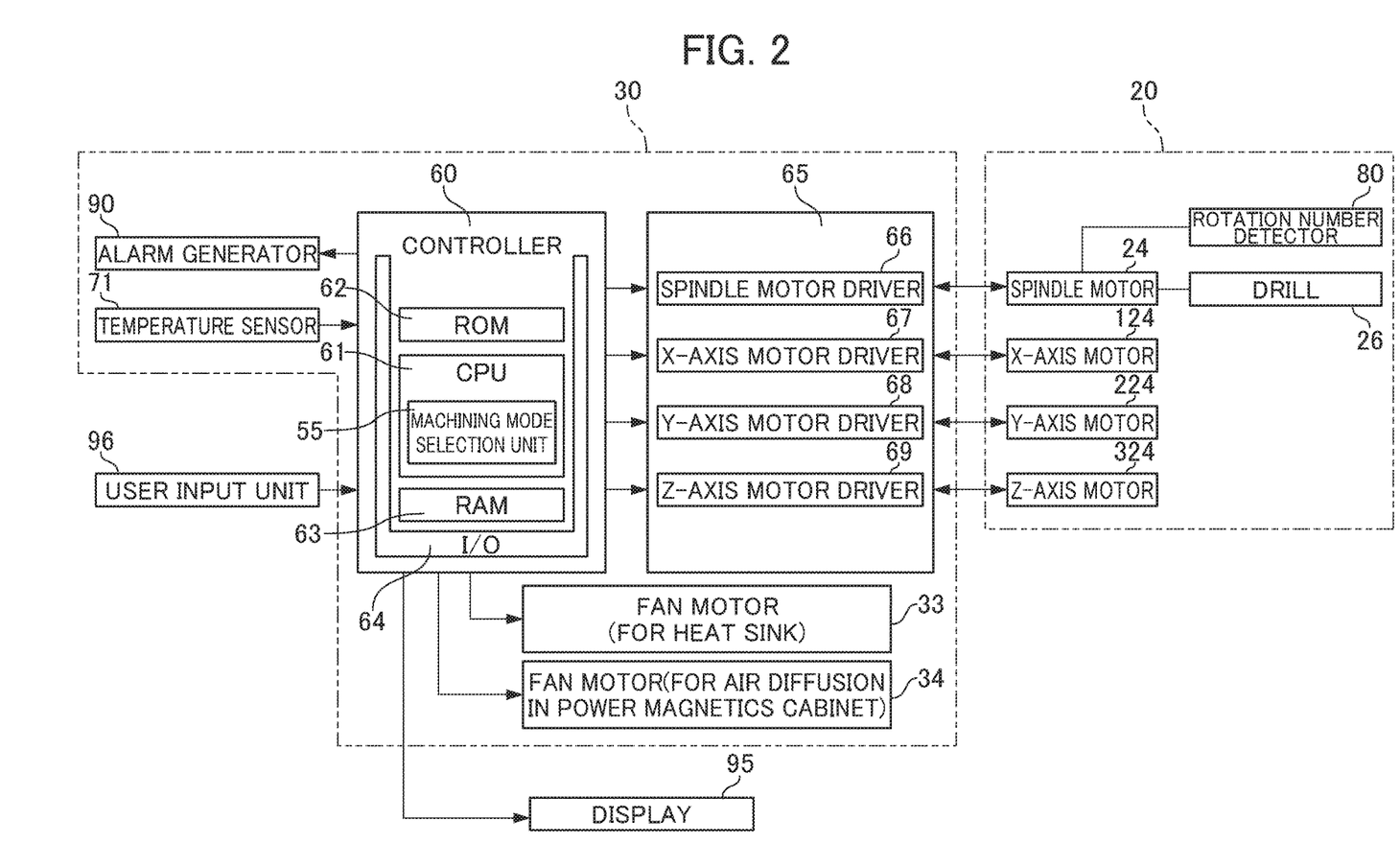
FIG. 2 is a block diagram of the motor controller according to the first embodiment of the present invention.

A motor controller according a first embodiment of the present invention and a machine tool including the motor controller will be described below by referring to the drawings. FIG. 1 is a sectional view schematically showing a machine tool 10 including a motor controller 100 according to the first embodiment of the present invention. FIG. 2 is a block diagram of the motor controller 100 provided in the machine tool 10. Principal structures of the machine tool 10 of the first embodiment include a machining unit 20, a drill 26, a power magnetics cabinet 30, and a controller 60. Of these structures, the power magnetics cabinet 30 and the controller 60 form the motor controller 100.

[Machining Unit]

The machining unit 20 includes a support column 21 as a machine support, a spindle unit 22, and a workpiece holder 27.

The support column 21 forms a main body of the structure of the machine tool 10, and mechanically supports structural elements of the machine tool 10 including the spindle unit 22, the workpiece holder 27, the power magnetics cabinet 30, etc. In particular, the support column 21 supports the drill 26 provided at the spindle unit 22 and supports a workpiece 50 held by the workpiece holder 27.

The support column 21 has a mechanism of adjusting the position of the drill 26 attached to the spindle unit 22 and the workpiece 50 fixed to the workpiece holder 27 relative to each other. The support column 21 includes a support member 28. The support column 21 includes a moving mechanism (not shown) arranged in the support column 21 and for moving the support member 28 in an X-axis direction, a Y-axis direction, and a Z-axis direction. The support column 21 also includes an X-axis motor 124, a Y-axis motor 224, and a Z-axis motor 324 (see FIG. 2) arranged in the support column 21. The X-axis motor 124, the Y-axis motor 224, and the Z-axis motor 324 are motors that generate power for the operation of the machine tool 10, particularly drive a moving mechanism for a guide (not shown) for moving the support member 28 in the X-axis direction, the Y-axis direction, and the Z-axis direction.

As the support member 28 moves in the X-axis direction, the Y-axis direction, and the Z-axis direction, the spindle unit 22 moves in the X-axis direction, the Y-axis direction, and the Z-axis direction. FIG. 1 shows the X, Y, and Z axes, and the X axis extends from the front to the back of the plane of the sheet of FIG. 1.

The support member 28 supports the spindle unit 22. The support member 28 moves integrally with the spindle unit 22.

The spindle unit 22 is a unit that holds the drill 26 as a machining member for machining on the workpiece 50 in a manner that allows attachment and detachment of the drill 26. The spindle unit 22 includes a spindle housing 23, a spindle motor 24, a shaft 25, and a rotation number detector 80. The spindle motor 24 is a motor that generates power for the operation of the machine tool 10, in particular, rotates the shaft 25 to which the drill 26 is attached. The rotation number detector 80 is a sensor that detects the rotation number of the spindle motor 24.

The workpiece holder 27 is a member coupled to the support column 21 and for holding the workpiece 50.

[Drill]

The drill 26 is attached to the shaft 25 of the spindle unit 22 so as to be detachable from the shaft 25. The drill 26 rotate about the central axis of the shaft 25.

[Power Magnetics Cabinet]

The power magnetics cabinet 30 includes a housing 31, a motor driver 65, a heat sink 32, a fan motor 33 and motor 34, a temperature sensor 71 and 72 as load detectors, and an alarm generator 90.

The housing 31 is attached to the support column 21. Specifically, the housing 31 and the support column 21 are integrated. The motor driver 65 and the fan motors 33 and 34 are fixed directly or indirectly to the housing 31. A relationship between these members in terms of vibration is as follows: When the fan motors 33 and 34 vibrate, the vibrations are transmitted to the housing 31 to cause the housing 31 to vibrate. When the housing 31 vibrates, resultant vibration W (see FIG. 1) is transmitted to the support column 21 to cause the support column 21 to vibrate.

The motor driver 65 includes a spindle motor driver 66, an X-axis motor driver 67, a Y-axis motor driver 68, and a Z-axis motor driver 69. The spindle motor driver 66 is a device that drives the spindle motor 24 of the spindle unit 22. The X-axis motor driver 67 is a device that drives the X-axis motor 124. The Y-axis motor driver 68 is a device that drives the Y-axis motor 224. The Z-axis motor driver 69 is a device that drives the Z-axis motor 324. The motor driver 65 is a device that adjusts the speeds of the motors 24, 124, 224, and 324 by means of motor voltage control or PWM control, for example.

The heat sink 32 is a member provided as a part of the configuration of the motor driver 65 and for releasing heat from the motor driver 65. The heat sink 32 includes multiple fins.

The fan motor 33 is a part arranged to face the heat sink 32 and for blowing cooling air for cooling the heat sink 32 of the motor driver 65 in the housing 31. The fan motor 34 is arranged on a bottom surface in the housing 31. While blowing cooling air upwardly, the fan motor 34 diffuses air in the housing 31.

The temperature sensor 71 is a sensor that measures a temperature at the motor driver 65 for detecting load applied to the motor driver 65. The temperature sensor 72 is a sensor that measures a temperature in the housing 31 for detecting load applied to the motor driver 65 and an electronic part in the housing 31 other than the motor driver 65.

The alarm generator 90 is an alarm unit that generates an alarm based on a result of detection by the temperature sensor 71. The alarm to be generated is not particularly limited. For example, the alarm may be generated as sound, emitted light, vibration, or a message (character), for example.

The controller 60 includes a CPU 61 as a control unit, a ROM 62, a RAM 63, and an input/output interface 64. The controller 60 is arranged in the power magnetics cabinet 30 and connected to the motor driver 65.

The CPU 61 includes a machining mode selection unit 55. The machining mode selection unit 55 is a part having a first machining mode and a second machining mode as machining modes, and having a function allowing selection of either the first machining mode or the second machining mode. The first machining mode is a mode of machining the workpiece 50 finely. For example, the first machining mode is a finishing mode of performing finishing on the workpiece 50 with the drill 26. For example, the finishing is milling on a surface of the workpiece 50. The second machining mode is a mode of machining the workpiece 50 more roughly than in the first machining mode. For example, the second machining mode is a normal machining mode of performing cutting or grinding on the workpiece 50 with the drill 26.

The finishing mode may have stepwise machining modes such as a first machining mode (for example, precise finishing mode) and a second machining mode (for example, normal finishing mode). Further, a cutting mode (or grinding mode) may have stepwise machining modes such as a first machining mode (for example, precise cutting mode) and a second machining mode (for example, normal cutting mode). As described above, the first machining mode and the second machining mode may include any machining mode, as long as the first machining mode and the second machining mode are correlated to each other in such a manner that the first machining mode is a mode of machining a machining target finely and the second machining mode is a mode of machining the machining target more roughly than in the first machining mode.

If the first machining mode is selected, the machining mode selection unit 55 exerts control to change the rotation numbers of the fan motors 33 and 34 so as to reduce vibration to be transmitted from the housing 31 to the support column 21, compared to vibration to be transmitted in the second machining mode.

Changing the rotation numbers of the fan motors 33 and 34 means reducing the rotation numbers of the fan motors 33 and 34 or stopping the fan motors 33 and 34. Phenomena generally occurring in terms of a relationship between the rotation numbers of the fan motors 33 and 34 and a vibration frequency are such that, increasing the rotation numbers of the fan motors 33 and 34 causes the fan motors 33 and 34 to vibrate more, and reducing the rotation numbers of the fan motors 33 and 34 causes the fan motors 33 and 34 to vibrate less.

By making a transition from a state where the rotation numbers of the fan motors 33 and 34 are high to a state where the rotation numbers of the fan motors 33 and 34 are low, the vibrations of the fan motors 33 and 34 are reduced. Further, by making a transition from a state where the fan motors 33 and 34 are rotated to a state where the fan motors 33 and 34 are stopped, the vibrations of the fan motors 33 and 34 are stopped.

It is assumed, for example, that the machining mode selection unit 55 has a cutting mode and a finishing mode, the rotation numbers of the fan motors 33 and 34 are set high in the cutting mode, and the rotation numbers of the fan motors 33 and 34 are set low in the finishing mode. In this case, if the finishing mode is selected, the machining mode selection unit 55 exerts control so as to reduce the rotation numbers of the fan motors 33 and 34 from the high rotation numbers of the fan motors 33 and 34 responsive to the cutting mode to the low rotation numbers of the fan motors 33 and 34 responsive to the finishing mode.

In some machine configurations, the rotation frequencies of the fan motors 33 and 34 and the natural vibration frequency of peripheral equipment may agree with each other to cause resonance. In this case, the rotation numbers of the fan motors 33 and 34 may be increased or reduced so as to make the rotation frequencies of the fan motors 33 and 34 go out of the natural vibration frequency of the peripheral equipment. Vibration resulting from the resonance becomes larger as the rotation frequency of a fan motor gets closer and closer to the natural vibration frequency of peripheral equipment, and becomes smaller as the rotation frequency of the fan motor goes out of the natural vibration frequency of the peripheral equipment. In terms of a relationship between the rotation numbers of the fan motors 33 and 34 and a vibration frequency, there is a range where, as the rotation numbers of the fan motors 33 and 34 are increased from the rotation numbers of the fan motors 33 and 34 corresponding to the natural vibration frequency of the peripheral equipment, the vibration of the machine tool 10 as a whole is reduced. In this range, by making a transition from a state where the rotation numbers of the fan motors 33 and 34 are low to a state where the rotation numbers of the fan motors 33 and 34 are high, the vibrations of the fan motors 33 and 34 are reduced. Reducing the vibration frequency of the machine tool 10 as a whole by increasing the rotation numbers of the fan motors 33 and 34 is considered to be effective control where finishing at a high speed is intended after implementation of cutting.

It is assumed, for example, that the machining mode selection unit 55 has a cutting mode and a high-speed finishing mode, the rotation numbers of the fan motors 33 and 34 are set at predetermined values if a machining mode is the cutting mode, and the rotation numbers of the fan motors 33 and 34 are set at values greater than the predetermined values if a machining mode is the high-speed finishing mode. In this case, if the high-speed finishing mode is selected, the machining mode selection unit 55 exerts control so as to increase the rotation numbers of the fan motors 33 and 34 from the rotation numbers of the fan motors 33 and 34 at the predetermined values responsive to the cutting mode to the rotation numbers of the fan motors 33 and 34 greater than the predetermined values responsive to the high-speed finishing mode.

The CPU 61 changes the rotation numbers of the fan motors 33 and 34 by changing an input voltage to the fan motors 33 and 34, for example. For example, the input voltage is set at 24 V in the second machining mode, the input voltage is set at 18 V in the first machining mode, and the input voltage is changed from 24 V to 18 V for changing a machining mode to the first machining mode. In this case, the input voltage is to be reduced stepwise, so that the rotation numbers of the fan motors 33 and 34 are to be reduced stepwise accordingly. This means that such stepwise change can be considered to be change in the rotations of the fan motors 33 and 34 from high-speed rotation, to middle-speed rotation, to low-speed rotation, and then to stop achieved by changing the input voltage as follows, for example: from a high voltage, to a middle voltage, to a low voltage, and then to 0 [V].

The CPU 61 may exert the foregoing control for voltage change under PWM control. In this case, the CPU 61 may transmit a PWM command to the fan motors 33 and 34 and change the rotation numbers of the fan motors 33 and 34. In this way, the CPU 61 exerts voltage control by changing a pulse width with which a voltage is to become ON, thereby adjusting the rotation numbers of the fan motors 33 and 34 finely. To employ the PWM control, a fan motor responsive to the PWM control is required. An input voltage to the fan motors 33 and 34 is changed linearly by exerting the PWM control, thereby allowing the rotation speeds of the fan motors 33 and 34 to be changed linearly.

If load detected by the load detector is determined to be greater than a predetermined threshold, more specifically, if a temperature detected by the temperature sensor 71 is determined to be greater (higher) than the predetermined threshold after the rotation numbers of the fan motors 33 and 34 are changed to rotation numbers responsive to the first machining mode (finishing mode, for example), the CPU 61 exerts control to change the rotation numbers of the fan motors 33 and 34 to the rotation numbers of the fan motors 33 and 34 responsive to the second machining mode (normal grinding or cutting mode, for example).

If the temperature detected by the temperature sensor 71 is determined to be greater than the predetermined threshold, the CPU 61 controls the alarm generator 90 so as to make the alarm generator 90 generate an alarm.

Figure 3:
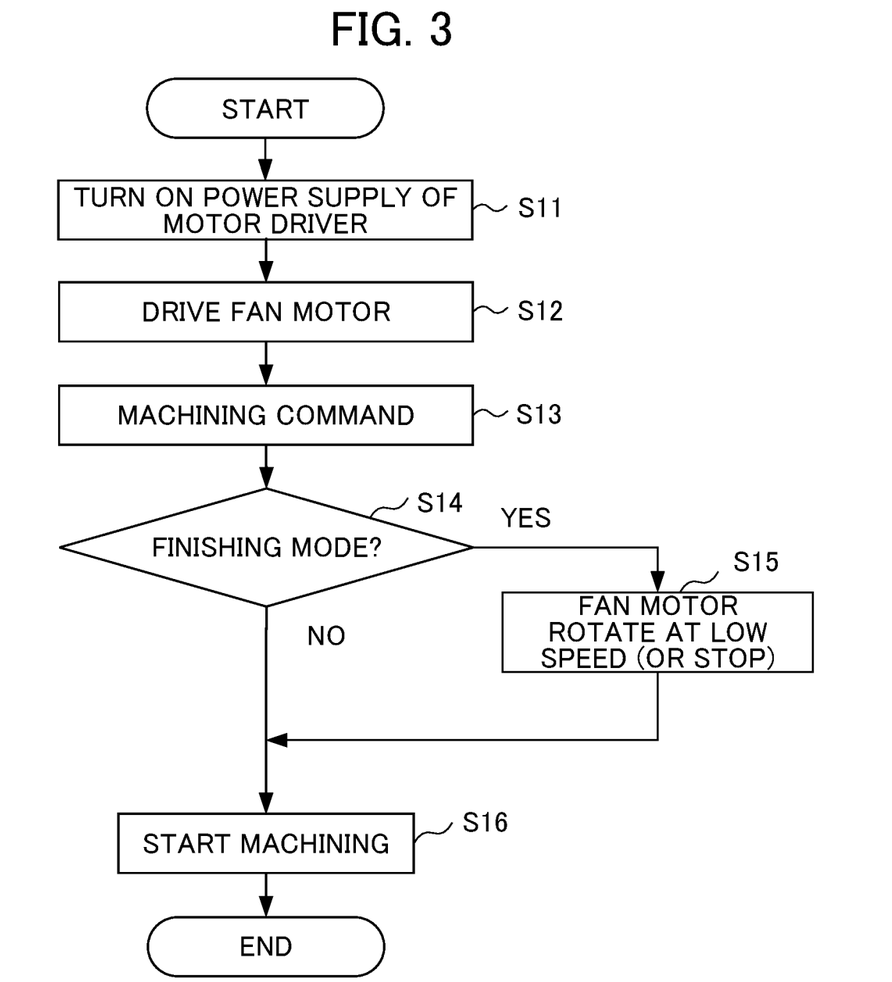
FIG. 3 is a flowchart for the motor controller according to the first embodiment of the present invention.

The ROM 62 contains various types of control programs for controlling drive of the machine tool 10 based on a machining program, a display program for making a display 95 display various types of display information, a control program such as that shown in FIG. 3 for changing the rotation numbers of the fan motors 33 and 34, and others.

The RAM 63 contains multiple machining programs, etc. including rotation number information for controlling drive of the spindle motor 24, the X-axis motor 124, the Y-axis motor 224, and the Z-axis motor 324, position information, and tool information.

The rotation numbers of the fan motors 33 and 34 may be changed as follows: a user determines the rotation numbers of the fan motors 33 and 34 responsive to the first machining mode, a CNC gives a command for the determined rotation numbers of the fan motors 33 and 34, and a motor driver (not shown) for the fan motors 33 and 34 gives a command for voltages at the fan motors 33 and 34. In this case, the CNC corresponds to the machining mode selection unit 55.

[Operation in First Embodiment]

The foregoing motor controller 100 of the machine tool 10 operates as follows. FIG. 3 is a flowchart for the motor controller according to the first embodiment of the present invention. As shown in FIG. 3, in step S11, the CPU 61 receives a signal for turning on a power supply of the motor driver 65. In step S12, the CPU 61 drives the fan motors 33 and 34 at rotation numbers responsive to the second machining mode. In step S13, the CPU 61 receives a machining command from a user input unit 96 (see FIG. 2).

In step S14, the machining mode selection unit 55 of the CPU 61 determines whether a machining mode in the machining command is a finishing mode. If the machining mode is the finishing mode (step S14: YES), the CPU 61 brings the procedure to step S15, and changes the rotation numbers of the fan motors 33 and 34 to rotation numbers responsive to the first machining mode. Then, in step S16, the CPU 61 starts machining. Meanwhile, if the machining mode is determined not to be a finishing mode in step S14 (step S14: NO), the CPU 61 brings the procedure to step S16. In this case, the fan motors 33 and 34 continue rotating without being changed in rotation number.

[Effect Achieved by First Embodiment]

The motor controller 100 of the first embodiment achieves the following effect, for example. The motor controller 100 of the first embodiment includes: the motor driver 65 arranged in the housing 31 attached to the support column 21 as a support of the machine tool 10 for machining on the workpiece 50; the fan motors 33 and 34 arranged in the housing 31; and the CPU 61. The motor driver 65 drives the motors 24, 124, 224, and 324 that generate power for the operation of the machine tool 10. The fan motors 33 and 34 blow cooling air for cooling the interior of the housing 31. The CPU 61 includes the machining mode selection unit 55 allowing selection of a machining mode from the first machining mode of machining the workpiece 50 finely and the second machining mode of machining the workpiece 50 more roughly than in the first machining mode. If the first machining mode is selected, the machining mode selection unit 55 exerts control to change the rotation numbers of the fan motors 33 and 34 so as to reduce vibration to be transmitted from the housing 31 to the support column 21, compared to vibration to be transmitted in the second machining mode.

Thus, in a situation where machine accuracy is required (where a surface of the workpiece 50 is to be machined, for example), it becomes possible to suppress transmission of the vibrations of the fan motors 33 and 34 to the support column 21 of the machine tool for machining on the workpiece 50.

In particular, cutting under low load is sufficient for finishing on the surface of the workpiece 50, for example, thereby reducing generation of heat from the motor driver 65, etc. In this case, even if the rotation numbers of the fan motors 33 and 34 are reduced or the fan motors 33 and 34 are stopped, trouble is unlikely to occur. Thus, it is unlikely that the vibrations of the fan motors 33 and 34 of the power magnetics cabinet 30 will be transmitted to the drill 26 of the machining unit 20, thereby enhancing the quality of the machining surface of the workpiece 50.

In the motor controller 100 of the first embodiment, changing the rotation numbers of the fan motors 33 and 34 means that the rotation numbers of the fan motors 33 and 34 are reduced so as to go out of the natural vibration frequencies of the fan motors 33 and 34, or the fan motors 33 and 34 are stopped. Thus, the vibrations of the fan motors 33 and 34 are reduced to reduce the vibration of the machine tool, thereby enhancing the machine accuracy of a machining target.

In the motor controller 100 of the first embodiment, changing the rotation numbers of the fan motors 33 and 34 means that the rotation numbers of the fan motors 33 and 34 are increased so as to go out of the natural vibration frequencies of the fan motors 33 and 34. Thus, the vibrations of the fan motors 33 and 34 are reduced to reduce the vibration of the machine tool, thereby enhancing the machine accuracy of the machining target.

Second Embodiment

Figure 4:
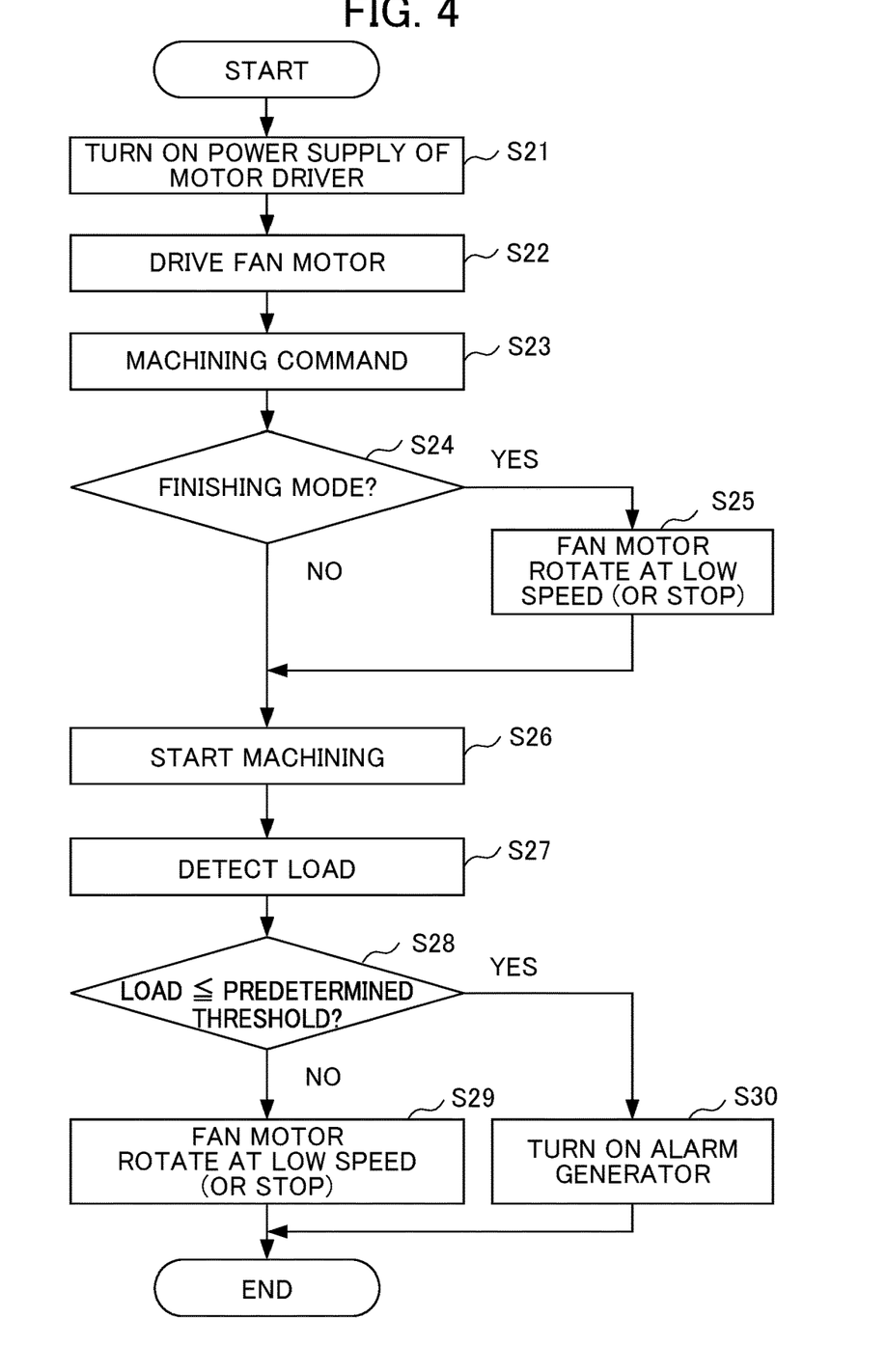
FIG. 4 is a flowchart for a motor controller according to a second embodiment of the present invention.

FIG. 4 is a flowchart for the motor controller 100 of the machine tool 10 according to a second embodiment. In the second embodiment, if a temperature at the motor driver 65 detected by the temperature sensor 71 or 72 is equal to or less than a predetermined threshold, the CPU 61 exerts control to change the rotation numbers of the fan motors 33 and 34 so as to reduce vibration to be transmitted from the housing 31 to the support column 21, compared to vibration to be transmitted in the second machining mode (cutting mode, for example). More specifically, if a temperature at the motor driver 65 is low, the CPU 61 reduces the rotation numbers of the fan motors 33 and 34, or stops driving the fan motors 33 and 34. Unless there is specific explanation about the second embodiment, the explanation about the first embodiment will also be applied appropriately.

[Operation in Second Embodiment]

In step S21, the CPU 61 receives a signal for turning on the power supply of the motor driver 65. In step S22, the CPU 61 drives the fan motors 33 and 34 at rotation numbers responsive to the second machining mode. In step S23, the CPU 61 receives a machining command from the user input unit 96 (see FIG. 2).

In step S24, the machining mode selection unit 55 of the CPU 61 determines whether a machining mode in the machining command is a finishing mode. If the machining mode is the finishing mode (step S24: YES), the CPU 61 brings the procedure to step S25, and changes the rotation numbers of the fan motors 33 and 34 to rotation numbers responsive to the first machining mode. Then, in step S26, the CPU 61 starts machining. Meanwhile, if the machining mode is determined not to be a finishing mode in step S24

(step S24: NO), the CPU 61 brings the procedure to step S26. In this case, the fan motors 33 and 34 continue rotating without being changed in rotation number.

In step S27, the machining mode selection unit 55 of the CPU 61 receives information about a temperature detected by the temperature sensor 71 or 72. In step S28, the machining mode selection unit 55 of the CPU 61 determines whether the temperature detected by the temperature sensor 71 or 72 is equal to or less than a predetermined threshold. If the temperature detected by the temperature sensor 71 or 72 is equal to or less than the predetermined threshold (step S28: YES), the CPU 61 brings the procedure to step S29, and changes the rotation numbers of the fan motors 33 and 34 to rotation numbers responsive to the first machining mode. Meanwhile, if the temperature detected by the temperature sensor 71 or 72 is not equal to or less than the predetermined threshold (step S28: NO), the CPU 61 transmits a control signal to the alarm generator 90 to turn on the alarm generator 90 while driving the fan motors 33 and 34 at rotation numbers responsive to the second machining mode.

[Effect Achieved by Second Embodiment]

The motor controller 100 of the second embodiment achieves the following effect, for example. In the motor controller 100 of the second embodiment, the temperature sensor 71 is a temperature sensor that detects a temperature at the motor driver 65. The temperature sensor 72 is a temperature sensor that detects a temperature in the housing 31. If a temperature detected by the temperature sensor 71 (or temperature sensor 72) is determined to be greater than a predetermined threshold after the rotation numbers of the fan motors 33 and 34 are changed to rotation numbers responsive to the first machining mode, the CPU 61 exerts control to change the rotation numbers of the fan motors 33 and 34 to the rotation numbers of the fan motors 33 and 34 responsive to the second machining mode. By doing so, even after the rotation numbers of the fan motors 33 and 34 are changed to rotation numbers responsive to the first machining mode, an equipment or a part such as the motor driver 65 in the housing 31 can be cooled with higher efficiency in response to application of high load to the equipment or the part such as the motor driver 65.

The motor controller 100 of the second embodiment further includes the alarm generator 90 that generates an alarm. If load detected by the temperature sensor 71 is determined to be greater than a predetermined threshold, the CPU 61 controls the alarm generator 90 so as to make the alarm generator 90 generate an alarm. This allows an operator of the machine tool to be easily notified of abnormality, for example, occurring at the motor controller 100.

[Modification]

The embodiments of the present invention have been described above. In the embodiments, the fan motor 33 is configured to be arranged at a position facing the heat sink 32. Further, the fan motor 34 is configured to be arranged on the bottom surface in the housing 31 of the power magnetics cabinet 30, and to blow air upwardly to diffuse air in the housing 31. However, these configurations of the embodiments are not restrictive. The fan motor 34 may be configured to face the spindle motor 24. Alternatively, the fan motors 33 and 34 may be configured to face other electronic parts in the housing 31 of the power magnetics cabinet 30.

In the embodiments, the CPU 61 is configured to control the rotation numbers of the fan motors 33 and 34 by means of voltage control under PWM control. However, this configuration of the embodiments is not restrictive. The CPU 61 may be configured to include a programmable logic controller (PLC) or a motor control center (MCC) as a part of the CPU 61, and to exert control so as to stop the fan motors 33 and 34 using the PLC or the MCC.

In the embodiments, the controller 60 is configured to be arranged in the housing 31. However, this configuration of the embodiments is not restrictive. The controller 60 may be provided at the support column 21. Alternatively, the controller 60 may be arranged at a position separated from the housing 31 of the power magnetics cabinet 30 and may be electrically connected to the motor driver 65.

In the embodiments, the controller is configured as a combination including the computer numerical controller (CNC), the motor driver 65, and the controller 60. However, this configuration is not restrictive. The CNC may include the control unit, the motor driver 65 may include the control unit, a different part may include the control unit, or the control unit may be distributed to parts.

The motor controller 100 of the embodiments is configured to change the rotation numbers of the fan motors 33 and 34 in response to determination of the rotation numbers of the fan motors 33 and 34 made by a user, a command for the rotation numbers of the fan motors 33 and 34 given from the CNC, and a voltage command given from the motor driver 65. However, this configuration is not restrictive.

(1) In one configuration, the rotation numbers of the fan motors 33 and 34 may be changed in response to determination of the rotation numbers of the fan motors 33 and 34 made by the CNC, and a command for the rotation numbers of the fan motors 33 and 34 and a voltage command given from the motor driver 65.

(2) In one configuration, the rotation numbers of the fan motors 33 and 34 may be changed in response to determination of the rotation numbers of the fan motors 33 and 34 made by the CNC, a command for the rotation numbers of the fan motors 33 and 34 given from the CNC, and a voltage command given from the PLC.

(3) In one configuration, the rotation numbers of the fan motors 33 and 34 may be determined by a determining module (a standardized part for determining the rotation numbers of the fan motors 33 and 34), a command for the rotation numbers of the fan motors 33 and 34 may be given from the CNC, and the rotation numbers of the fan motors 33 and 34 may be changed by a particular circuit in the motor driver 65. In the foregoing cases (1) to (3), the function of determining the rotation numbers of the fan motors 33 and 34 and the function of giving a command for the rotation numbers correspond to the foregoing control by the machining mode selection unit 55, and the function of giving a voltage command corresponds to control by a part of the CPU 61 other than the machining mode selection unit 55.

In the embodiments, finishing is milling on a surface of the workpiece 50. However, finishing is not limited to this milling but may be spring necked machining or polishing with a grinder, for example.

In the embodiments, the temperature sensor 71 is configured as a temperature sensor that detects a temperature at the motor driver 65. Further, the CPU 61 is configured in such a manner that, if a temperature detected by the temperature sensor 71 is determined to be greater than a predetermined threshold after the rotation numbers of the fan motors 33 and 34 are changed to rotation numbers responsive to the first machining mode, the CPU 61 exerts control to change the rotation numbers of the fan motors 33 and 34 to the rotation numbers of the fan motors 33 and 34 responsive to the second machining mode. However, these configurations are not restrictive. The temperature sensor 71 may be replaced by the temperature sensor 72 that measures a temperature in the housing 31. If a temperature detected by the temperature sensor 72 is determined to be greater than a predetermined threshold after the rotation numbers of the fan motors 33 and 34 are changed to rotation numbers responsive to the first machining mode, the CPU 61 may exert control to change the rotation numbers of the fan motors 33 and 34 to the rotation numbers of the fan motors 33 and 34 responsive to the second machining mode.

The motor controller 100 of the embodiments includes the temperature sensor 71 that detects load applied to the motor driver 65. If a temperature detected by the temperature sensor 71 is determined to be equal to or less than a predetermined threshold, the CPU 61 exerts control to change the rotation numbers of the fan motors 33 and 34 so as to reduce vibration to be transmitted from the housing 31 to the support column 21, compared to vibration to be transmitted in the second machining mode. However, this configuration is not restrictive.

(1) In one configuration, load applied to the motor driver 65 may be specified by an input current detector that detects an input current to be input to the motor driver 65. If the input current is low, the rotation numbers of the fan motors 33 and 34 may be changed.

(2) In one configuration, load applied to the motor driver 65 may be specified by an output current detector that detects an output current to be output from the motor driver 65 to the motors 24, 124, 224, and 324. If the output current is low, the rotation numbers of the fan motors 33 and 34 may be changed.

(3) In one configuration, load applied to the motor driver 65 may be specified by a rotation number detector that detects the rotation numbers of the motors 24, 124, 224, and 324. If the rotation numbers are low, the rotation numbers of the fan motors 33 and 34 may be changed. This rotation number detector corresponds to the rotation number detector 80 for the spindle motor 24 shown in FIG. 1.

(4) In one configuration, load applied to the motor driver 65 may be specified by a load calculator that calculates the load based on machining information input to a machine tool. If the calculated load is low, the rotation numbers of the fan motors 33 and 34 may be changed.

(5) In one configuration, load applied to the motor driver 65 may be determined by a user based on actual machining and specified through the user input unit 96 for input of the load. If the input load is low, the rotation numbers of the fan motors 33 and 34 may be changed.

(6) The fan motor may be arranged outside the housing. In this case, the fan motor is arranged fixedly outside the housing, for example.

(7) The machining mode is not limited to the first machining mode and the second machining mode but may include a third machining mode or a fourth machining mode different from the first machining mode and the second machining mode.

(8) The motor driver may be arranged in the housing in its entirety, or may be arranged partially outside the housing. Alternatively, the motor driver may be arranged outside the housing in its entirety. In this case, the motor driver is arranged fixedly outside the housing, for example.

EXPLANATION OF REFERENCE NUMERALS

10 Machine tool
20 Machining unit
21 Support column (machine support)
28 Support member
24 Spindle motor (motor)
31 Housing
65 Motor driver
33 Fan motor
34 Fan motor
50 Workpiece (machining target)
61 CPU (control unit)
55 Machining mode selection unit
71 Temperature sensor (load detector)
72 Temperature sensor (load detector)
90 Alarm generator
100 Motor controller
124 X-axis motor (motor)
224 Y-axis motor (motor)
324 Z-axis motor (motor)

What is claimed is:

1. A motor controller comprising: a motor driver arranged at a housing attached to a machine support as a support of a machine tool for machining on a machining target; a fan motor arranged in or outside the housing; and a control unit, wherein
    the motor driver drives a motor that generates power for the operation of the machine tool,
    the fan motor blows cooling air for cooling the interior of the housing,
    the control unit includes a machining mode selection unit allowing selection of a machining mode from at least a first machining mode of machining the machining target finely and a second machining mode of machining the machining target more roughly than in the first machining mode, and
    if the first machining mode is selected, the machining mode selection unit exerts control to change the rotation number of the fan motor so as to reduce vibration to be transmitted from the housing to the machine support, compared to vibration to be transmitted in the second machining mode.

2. The motor controller according to claim 1, further comprising a load detector that detects load applied to the motor driver, wherein
    if load detected by the load detector is determined to be equal to or less than a predetermined threshold, the control unit exerts control to change the rotation number of the fan motor so as to reduce vibration to be transmitted from the housing to the machine support, compared to vibration to be transmitted in the second machining mode.

3. The motor controller according to claim 2, wherein, if the load detected by the load detector is determined to be greater than the predetermined threshold after the rotation number of the fan motor is changed to a rotation number responsive to the first machining mode, the control unit exerts control to change the rotation number of the fan motor to the rotation number of the fan motor responsive to the second machining mode.

4. The motor controller according to claim 2, further comprising an alarm generator that generates an alarm, wherein,
    if the load detected by the load detector is determined to be greater than the predetermined threshold, the control unit controls the alarm generator so as to make the alarm generator generate an alarm.

5. The motor controller according to claim 1, wherein changing the rotation number of the fan motor means that the rotation number of the fan motor is reduced so as to go out of the natural vibration frequency of the fan motor, or the fan motor is stopped.

6. The motor controller according to claim 1, wherein changing the rotation number of the fan motor means that the rotation number of the fan motor is increased so as to go out of the natural vibration frequency of the fan motor.

7. A machine tool comprising: the motor controller according to claim 1;
 the machine support; and
 the motor.

\* \* \* \* \*